United States Patent Office 3,240,737
Patented Mar. 15, 1966

3,240,737
METHOD OF DEGRADING WATER-SOLUBLE POLYMERS WITH FERROUS SALTS AND A FERRIC CHELATING AGENT
Keith R. McKennon, Concord, Calif., assignor to The Dow Chemical Company, Midland, Mich., a corporation of Delaware
No Drawing. Filed Dec. 26, 1963, Ser. No. 333,744
14 Claims. (Cl. 260—29.2)

The present invention concerns a process for reducing the molecular weight of water-soluble, resinous polymers. The invention generally achieves a reduction in any effect of the water-soluble polymers directly proportional to their molecular weight. More particularly, the invention provides a process for thinning aqueous media thickened with water-soluble, resinous polymers. The invention is further concerned with the dissolution and dispersion of water-soluble, resinous polymers blinding filter media.

There are numerous instances in which control over or essentially reversals in the function of water-soluble polymers become desirable. For instance, on occasion it may be desired to promote redispersion of a flocculated phase in an aqueous medium. Illustratively, sewage solids once flocculated are settled and recovered as a sludge. Thereafter, the flocculated sludge is often subjected to processing whereby it is partially or completely decomposed by oxidation or digestion under anaerobic conditions. Such decomposition processes would in some instances be promoted by redispersion of the flocculated solids in the sludge.

A seemingly opposite result is sought in those applications for resinous polymers wherein the polymer is initially utilized to promote and maintain a dispersion of a solid phase within an aqueous medium. Such compositions are used for liquid grinding and polishing media, utilizing as the dispersed solid phase varius sharp mineral grains. As the polishing medium becomes contaminated with foreign matter during use, it is occasionally desired to thin out the thickened suspension and thereby permit settling and recovery of the dispersed mineral phase for re-use.

Another use for a process to degrade water-soluble polymers relates to the blinding of filter media. Sometimes when water-soluble, flocculating polymers are used for flocculation of a suspended phase in an aqueous medium, the polymer may cause blinding of filter media subsequently employed to separate the flocculated solids from their aqueous dispersion. Blinding may also occur in formations penetrated by wells during certain operations, such as, for example, the deep well disposal of aqueous liquids containing dissolved polymers. Over a period of time, small amounts of polymer may accumulate on the surface of the subterranean formation defining the well. Ultimately a coating of the polymer can form which will impede and possibly completely prevent the movement of liquid into the formation. When such blinding of a filter surface occurs, it is desirable to employ a process whereby the polymer coating can be degraded and redispersed. Upon redispersion of the polymer, it may be removed from the well by bailing or simply flushing it into the formation.

It is known that molecular weight degradation of resinous polymers can be induced through the employment of a redox system in aqueous media. Illustratively, John J. Collins et al., Industrial Engineering Chemistry, v. 49, Nov. 1957, pp. 1843–1848, show that the combination of ferrous sulfate and air causes degradation of polymers in solution. The rate of molecular weight degradation accomplished by such conventional redox systems is too slow for the needs of the foregoing applications.

It would be desirable, and it is an object of the present invention to increase the rate at which molecular weight degradation of water-soluble, resinous polymers is achieved. Particular objects involve providing a process to accomplish the deflocculation of polymer flocculated solids in an aqueous medium, thinning of a polymer thickened aqueous dispersion of solid particles and the dispersion of water-soluble polymers blinding porous media. These and other objects, such as will become apparent hereinafter, are accomplished in accordance with the present invention.

The invention involves a method for degrading the molecular weight of water-soluble, resinous polymers, which method comprises the following steps to be carried out in any order: contacting the water-soluble, resinous polymer with an oxygenated, aqueous medium; dissolving in the oxygenated, aqueous medium at least about 0.00001 percent up to as much as about 5 percent by weight of ferrous ions; and dissolving in the oxygenated, aqueous medium from about 0.001 up to as much as about 5 percent by weight of a ferric ion chelating agent. The foregoing percentages are based on the weight of the aqueous medium. Preferably the amount of the ferric ion chelating agent used is at least sufficient to chelate all of the added iron. While the chelating agent is specified in terms of its activity toward ferric ions, i.e., its propensity to form chelates with ferric ions is greater than its propensity to form chelates with ferrous ions, it should be recognized that any amount of chelating agent in excess of that used up in the formation of ferric chelates will complex with available ferrous ions. Although it is not essential to the invention, best results are obtained if the iron chelates formed during the operation are soluble in water.

The aqueous medium may be water or a liquid containing at least a major proportion of water, which liquid is a solvent for the resinous polymer. The contacting of the resinous polymer with the aqueous medium can occur as a result of having dissolved the polymer in the aqueous medium to which the ferrous ions and ferric chelating agent are likewise added or an alternate and equally effective mode of operation involves first adding the ferrous ions and/or ferric ion chelating agent to the oxygenated, aqueous medium and applying the resulting solution to the polymer. The latter technique is that employed in dispersing polymer coatings blinding the surface of porous media, such as filtration media.

The oxygen content of the oxygenated, aqueous medium specified above is that amount of dissolved oxygen sufficient to induce significant molecular degradation of the polymer with the conjoint existence of the other specified conditions. In order to produce significant degradation of the resinous polymers, the aqueous medium containing, or contacting the polymer, and containing the other reagents essential to the invention should be oxygenated, i.e., containing dissolved oxygen, to the extent of at least about one part per million parts by weight of the aqueous medium. There is no upper limit on the oxygen content other than that dictated by practical considerations. Thus, the aqueous medium may contain any amount of oxygen up to its saturation point under the ambient temperature and pressure conditions. Normal atmospheric pressures will prevail for most applications, but this condition may be altered by design or inherently as the process is carried out. An example of the later instance would be the pressure change on the aqueous medium occurring from the top of the bottom of a well. The hydrostatic head above the system at the bottom of the well would promote the dissolution of large amounts of oxygen, to the extent oxygen is made available under such conditions.

The ferric ion chelating agents useful herein comprise a well-known group of chemical compounds disclosed in a variety of patents and other publications, reference being had, for instance, to "Chemistry of the Metal Chelate Compounds" by Martell and Calvin, Prentice-Hall, Inc., 1952. A patent reference for ferric chelating agents is United States Patent 2,828,182. Preferred chelating agents for ferric ions include those falling into the generic categories of organic polycarboxylates or organic polyhydroxypolycarboxylates which chelating agents form water-soluble iron-organic complexes. Chelating agents of this nature are disclosed in United States Patent 3,051,563. Usually, such chelating agents are effective over a wide range of pH conditions, e.g., from a pH of about 1 up to 10. Best results, however, are obtained with ferric ion chelating agents wherein the solution is adjusted, as necessary, to a pH within the range of about 4 to about 8.5.

The ferrous ions can be incorporated into the aqueous medium in the form of any convenient water-soluble ferrous salt. For the purposes herein, a ferrous salt is water-soluble if it dissolves in water to the extent of several parts per million. Examples of salts than can be used include ferrous acetate, ferrous carbonate, ferrous ammonium sulfate, ferrous bromide, ferrous chloride, ferrous hydroxide, ferrous oxalate, ferrous phosphate, ferrous sulfate and ferrous thiosulfate. Depending upon the nature of other solutes and the pH of the aqueous medium, a convenient procedure for incorporating ferrous ions involves passing the aqueous medium, with or without the other additives essential to the practice of the invention, through a bed of ion filings whereby the oxidation and dissolution of appropriate amounts of the iron are promoted.

The polymers degraded by the process of the invention are water-soluble, resinous, i.e., high molecular weight, organic polymers, sometimes referred to as hydrophilic polymeric colloids. The term "water-soluble," as employed in the foregoing terminology, means dispersible in water to provide a visually homogeneous system. Such polymers are usually essentially linear or branched in structure, but may contain some cross-linking so long as the polymer is effectively swollen by and uniformly dispersed in water.

Water solubility is imparted to such polymers by incorporating in and along the polymer chain a number of hydrophilic moieties sufficient to more than offset the otherwise hydrophobic character of the organic polymer. One class of such hydrophilic moieties includes the ionizable groups. Among these are the sulfate and sulfonate acid and salt groups, carboxylate salt groups, amino and ammonium groups, the latter being inclusive of protonated forms of amines as well as quaternary derivatives of the amines, eg., mono-, di- and trialkyl substituted ammonium salt groups, and phosphonic acid and mono- and dibasic salts thereof. Whenever acid salts are referred to, those preferred are the alkali metal, alkaline earth metal (water-soluble species thereof) and ammonium salts. The total carbons of any substituents on the nitrogen in the ammonium cations should not exceed about 12 carbons in order to insure the water solubility of the resulting salt. Another class of hydrophilic moieties are such non-ionizable groups as carboxamide, and mono- and dialkyl nitrogen substituted carboxamides, having a total of up to about 8 carbons, and hydroxyl groups. Also of a non-ionizable hydrophilic nature, though less strongly than some of the aforementioned groups are acetal, ketal, alkylene oxide, carbamate and lactam groups. In any event, the polymers employed herein contain one or more of the aforedescribed hydrophilic moieties and the like in and along the polymer chain in a sufficient amount to render the resulting polymer water-soluble, as defined above.

"Resinous," as employed to characterize the polymers, means macromolecular in size. It is otherwise apropros to characterize such polymers as being of "high molecular weight." While a given minimum molecular weight would be arbitrary, especially when used to define across the board the transition point between low polymers and macromolecules, polymers are to be generally considered as having "high molecular weights" or being resinous for purposes herein at weight average molecular weights above about 100,000. In the instance of vinyl addition polymers, the resinous polymers may attain weight average molecular weights as great as 10 million or more.

Water-soluble resinous polymers are obtained as naturally occurring polymers or by various modifications of the naturally occurring polymers as well as by synthesis by means of addition or condensation polymerizations of appropriate monomers. Technology for preparing water-soluble polymers useful herein is known. The chemistry of many water-soluble resinous polymers to which the process of the invention is applicable will be found among the teachings concerning addition polymers obtained by ethylenic polymerization such as those described in Hedrick et al., United States Patent 2,625,-529; Aimone et al., United States Patent 2,740,522; and Booth et al., United States Patent 2,729,557. A variety of polysacchride derivatives are described by Gloor in United States Patent 2,728,725. Polyurethanes and chain extended polyols will be found in Honea et al., United States Patent 3,054,778 and Colwell et al., United States Patent 3,020,231, respectively, and a variety of polycarbamates and lactams in Hibbard et al., United States Patent 3,044,992; Walles et al., United States Patent 2,946,772; Vitales, United States Patent 2,874,124; and Fong et al., United States Patent 3,000,830. These are to mention but a few of the well-known chemical preparations for water-soluble macromolecules or resinous polymers. The polymers concerned herein will often be otherwise identified as water-soluble polyelectrolytes or water-soluble organic flocculants. Further general descriptions of a variety of water-soluble resinous polymers are contained in Davidson and Sitting, "Water-Souble Resins," Reinhold Publishing Corp., New York, 1962.

The amount of the water-soluble, resinous polymer present in, or in contact with, the aqueous medium has no essential bearing on the present invention. Normally, for convenience and ease of handling, aqueous solutions of the water-soluble, resinous polymers will contain less than 50 percent polymer solids. Ultrahigh molecular weight materials, e.g., resinous polymers having molecular weights as great as 0.5 million or more are generally dissolved in aqueous media in amounts of less than about 25 percent by weight of the total system. The results of the invention, i.e., molecular weight degradation or viscosity loss of the polymer, are evident in polymer solutions containing as little as 1 part of resinous polymer per million parts by weight of the solution. When polymer coatings are treated in accordance with the invention, the resulting water dispersibility of the coating evidences the effect of the invention.

As indicated by the nature of the uses for the invention, the aqueous medium may contain components in addition to those essential to the practice of the invention. For instance, if the polymer to be degraded has been used to flocculate a dispersed suspension of finely divided solids, it will normally comprise but a very minor proportion, usually much less than one percent of the flocculated system. A similar dilute polymer solution will exist if the water-soluble polymer resin is initially employed in the aqueous medium as a thickening or dispersing agent. Like considerations obtain whenever the water-soluble polymer resin to be treated is found to be blinding porous filter media except that the resin is concentrated on the surface of the filter media.

To further illustrate the invention, without the intention of limiting the parameters of the same unless otherwise as specified hereinbefore, applicant sets forth the following exemplary operations concerning preferred embodiments of the invention as it is presently understood.

*Example 1*

To an aqueous medium consisting of a 3 percent sodium chloride solution in water, saturated with oxygen at a temperature of about 20° C. and under air at normal atmospheric pressure, was added 0.5 percent by weight of the aqueous medium of a high molecular weight, partially hydrolyzed polyacrylamide. The polymer was characterized by hydrolysis of approximately 25 percent of the initially available carboxamide groups to sodium carboxylate groups and by a molecular weight of at least about 2 million. The resulting polymer solution was neutralized to a pH of 7 by the addition of a small amount of HCl. An initial viscosity was obtained for the polymer solution at 25° C. employing a Fann viscosimeter. The initial viscosity of the polymer solution was aproximately 10 centipoises.

The polymer solution was then treated with approximately 78.4 parts per million, based on the weight of the total polymer solution, of a ferric ion chelating agent consisting of trisodium-N-hydroxyethylethylenediaminetriacetate. Five minutes after incorporating the chelating agent into the polymer solution, its viscosity was again measured in an identical manner. No molecular degradation of the polymer had occurred as evidenced by a viscosity value equal to that obtained before.

At this point 9 parts of ferrous ions per million parts by weight of the polymer solution were added to the polymer solution. The ferrous ions were added in the form of a dilute aqeous solution of ferrous ammonium sulfate. Five minutes after the addition of the ferrous ions, the viscosity of the polymer solution, measured as before, was 4 centipoises, the molecular weight of the polymer having been degraded to give a 60 percent reduction of the original polymer solution viscosity.

To further illustrate the dependence of the rate of viscosity reduction on the proportion of ferrous ion present in solution, another solution of the above polymer was prepared with sufficient polymer solute to provide an initial solution viscosity of 1.5 centipoises. To each of several aliquots of this solution was added 100 parts of the above-described ferric ion chelating agent per million parts by weight of the polymer solution and a series of incrementally increasing amounts of ferrous ions. The amounts of ferrous ions utilized and the resulting viscosities of the particular solution aliquots after 5 minutes are reported in the following table.

TABLE I

| $Fe^{++}$, p.p.m.: | 5 minute viscosity, cps. |
|---|---|
| 0 | 1.54 |
| 0.25 | 1.37 |
| 0.5 | 1.26 |
| 1 | 1.18 |
| 2 | 1.05 |

*Example 2*

In a manner similar to the procedure employed in Example 1, dilute solutions of hydroxypropylmethyl cellulose ether (cellulose ether) and a high molecular weight sodium polystyrene sulfonate (SPSS) were prepared in an aqueous brine containing 3 percent sodium chloride. To the brine was added 100 parts per million of the chelating agent employed in Example 1 and 10 parts per million of ferrous ions. The initial solution viscosities were obtained prior to the addition of the ferrous ions. After the addition of the ferrous ions, the viscosity was again measured after several time intervals. The results of these experiments are set forth in the following Table II.

TABLE II

| Polymer solute | Seconds after treatment | Viscosity (cps.) |
|---|---|---|
| Cellulose ether | [1] 0 | 20.7 |
| Do | 60 | 18.5 |
| Do | 130 | 14.7 |
| Do | 355 | 14.2 |
| SPSS | [1] 0 | 4.0 |
| Do | 40 | 3.0 |
| Do | 80 | 2.0 |
| Do | 500 | 1.9 |

[1] Initial.

Like results in the degradation of high molecular weight, water-soluble polyacrylamides were achieved in comparable experiments in which citric acid, tetrasodium ethylenediaminetetraacetate, N,N'-di-α-hydroxyacetic acid ethylenediamine and sodium hexametaphosphate were substituted for the chelating agent employed in the foregoing examples. Similar molecular degradation or viscosity reduction occurs when a high molecular weight polyethylene oxide is substituted for the water-soluble resins employed in the above examples.

What is claimed is:

1. A method for degrading water-soluble, resinous polymers, which method comprises the steps to be carried out in any order:
    contacting the water-soluble, resinous polymer with an oxygenated aqueous medium,
    dissolving in the oxygenated, aqueous medium at least about 0.00001 percent up to about 5 percent by weight of ferrous ions based on the weight of the aqueous medium, and
    dissolving in the oxygenated, aqueous medium from about 0.001 up to about 5 percent by weight of a ferric ion chelating agent based on the weight of the aqueous medium.

2. A method as in claim 1 wherein the amount of the ferric ion chelating agent utilized is sufficient to complex essentially all of the added iron.

3. A method for degrading water-soluble, resinous polymers, which method comprises the steps to be carried out in any order:
    contacting the water-soluble, resinous polymer with an oxygenated, aqueous medium,
    dissolving in the oxygenated, aqueous medium at least about 0.00001 percent up to about 5 percent by weight of ferrous ions based on the weight of the aqueous medium, and
    dissolving in the oxygenated, aqueous medium from about 0.001 up to about 5 percent by weight of a ferric ion chelating agent based on the weight of the aqueous medium characterized in that its propensity to form a complex with ferric ions is stronger than its propensity to form a complex with ferrous ions and the resulting iron chelate is soluble in water.

4. A method for degrading water-soluble, resinous polymers, which method comprises the steps to be carried out in any order:
    contacting the water-soluble, resinous polymer with an oxygenated, aqueous medium containing at least one part per million parts by weight thereof of dissolved oxygen,
    dissolving in the oxygenated, aqueous medium at least about 0.00001 percent up to about 5 percent by weight of ferrous ions based on the weight of the aqueous medium, and
    dissolving in the oxygenated, aqueous medium from about 0.001 up to about 5 percent by weight of a ferric ion chelating agent based on the weight of the aqueous medium characterized in that its propensity to form a complex with ferric ions is stronger than its propensity to form a complex with ferrous ions and the resulting iron chelate is soluble in water.

5. A method for degrading water-soluble, resinous polymers, which method comprises the steps to be carried out in any order:

contacting the water-soluble, resinous polymer with an oxygenated, aqueous medium containing at least one part per million parts by weight thereof of dissolved oxygen, dissolving in the oxygenated, aqueous medium a sufficient amount of a water-soluble ferrous salt to provide at least about 0.00001 percent up to about 5 percent by weight of ferrous ions, and dissolving in the oxygenated, aqueous medium from about 0.001 up to about 5 percent by weight of a ferric ion chelating agent based on the weight of the aqueous medium characterized in that its propensity to form a complex with ferric ions is stronger than its propensity to form a complex with ferrous ions and the resulting iron chelate is soluble in water.

6. A method for degrading water-soluble, resinous polymers, which method comprises the steps to be carried out in any order:

contacting the water-soluble, resinous polymer with an oxygenated, aqueous medium containing at least one part per million parts by weight thereof of dissolved oxygen, dissolving in the oxygenated, aqueous medium a sufficient amount of a water-soluble ferrous salt to provide at least about 0.00001 percent up to about 5 percent by weight of ferrous ions, and dissolving in the oxygenated, aqueous medium from about 0.001 percent up to about 5 percent by weight of an organic chelating agent selected from the group consisting of polycarboxylic and polyhydroxypolyboxylic organic chelating agents for ferric ions, which chelating agents form water-soluble iron chelates.

7. A method as in claim 5 wherein the ferric ion chelating agent is citric acid.

8. A method as in claim 5 wherein the ferric ion chelating agent is tetrasodium ethylenediaminetetraacetate.

9. A method as in claim 5 wherein the ferric ion chelating agent is trisodium-N-hydroxy-ethylethylenediaminetriacetate.

10. A method as in claim 5 wherein the ferric ion chelating agent is sodium hexametaphosphate.

11. A method as in claim 5 wherein the pH of the aqueous medium is adjusted as necessary to within the range from about 1 to about 10.

12. A method for reactivating porous media blinded with a water-soluble, resinous polymer, which method comprises contacting the water-soluble, resinous polymer with an aqueous solution containing at least one part of dissolved oxygen per million parts by weight of the solution, at least about 0.00001 percent up to about 5 percent by weight of ferrous ions based on the weight of the aqueous medium, and from about 0.001 percent up to 5 percent by weight of a ferric ion chelating agent based on the weight of the aqueous medium.

13. A method as in claim 12 wherein the amount of the ferric ion chelating agent added is sufficient to complex essentially all of the added iron.

14. A method as in claim 12 wherein the pH of the aqueous solution is adjusted as necessary to within the range from about 1 to about 10.

References Cited by the Examiner

Collins et al., Industrial and Engineering Chemistry, vol. 49, Nov. 1957, pp. 1843–1848.

Chaberek et al., Organic Sequestering Agents, Wiley, 1959, p. 393.

MURRAY TILLMAN, *Primary Examiner.*